(12) United States Patent
Kormann et al.

(10) Patent No.: US 8,337,283 B2
(45) Date of Patent: Dec. 25, 2012

(54) CROP SAMPLE PRESENTATION SYSTEM

(75) Inventors: Georg Kormann, Zweibrücken (DE);
James J. Phelan, Bettendorf, IA (US);
Andrzej Kozicki, Milan, IL (US);
Thomas Herlitzius, Coswig (DE); Jens Teichmann, Panschwitz-Kuckau (DE);
Andi Günther, Dresden (DE)

(73) Assignee: Deere & Company, Moline, IL (US)

( * ) Notice: Subject to any disclaimer, the term of this patent is extended or adjusted under 35 U.S.C. 154(b) by 57 days.

(21) Appl. No.: 12/957,664

(22) Filed: Dec. 1, 2010

(65) Prior Publication Data

US 2011/0151952 A1    Jun. 23, 2011

Related U.S. Application Data

(60) Provisional application No. 61/285,578, filed on Dec. 11, 2009.

(51) Int. Cl.
*A01D 75/18* (2006.01)

(52) U.S. Cl. ... 460/7; 73/863.21; 73/863.31; 73/863.41; 73/863.61; 73/863.71

(58) Field of Classification Search ............... 56/10.2 B, 56/10.2 C; 460/4, 5, 7, 114, 115, 119; 250/341.8; 324/643, 664, 694; 73/73, 863.021, 863.31, 73/863.41, 863.61, 863.71, 863.73
See application file for complete search history.

(56) References Cited

U.S. PATENT DOCUMENTS

| 4,068,223 | A | * | 1/1978 | Steffen ........................ 340/608 |
| 5,092,819 | A |   | 3/1992 | Schroeder et al. |
| 5,750,877 | A | * | 5/1998 | Behnke et al. ................ 73/1.33 |
| 6,155,103 | A | * | 12/2000 | Diekhans et al. ................ 73/73 |
| 6,285,198 | B1 |  | 9/2001 | Nelson et al. |
| 6,327,899 | B1 |  | 12/2001 | Diekhans et al. |
| 6,686,749 | B2 |  | 2/2004 | Rains et al. |
| 6,845,326 | B1 | * | 1/2005 | Panigrahi et al. ............... 702/22 |
| 7,771,262 | B2 | * | 8/2010 | Missotten ..................... 460/114 |
| 7,861,606 | B2 | * | 1/2011 | Kormann .................. 73/863.53 |
| 8,032,255 | B2 | * | 10/2011 | Phelan et al. ................ 700/281 |
| 8,045,168 | B2 | * | 10/2011 | Missotten et al. ............ 356/445 |
| 2011/0086684 | A1 |  | 4/2011 | Luellen et al. |

FOREIGN PATENT DOCUMENTS

| DE | 10236515 | 9/2003 |
| EP | 2119339 | 4/2011 |

* cited by examiner

*Primary Examiner* — Alicia Torres

(57) ABSTRACT

A system for presenting a crop sample to a crop property sensor is in particular suited for a harvesting machine and comprises a bypass line branching off from a crop feeding assembly, a conveyor for feeding the branched-off crop through the bypass line without damaging the crop, and a crop property sensor for sensing one or more properties of the crop in the bypass line. The bypass line is upwardly angled or extends vertical, such that the conveyor elevates the material from the crop guiding channel to the crop property sensor.

20 Claims, 2 Drawing Sheets

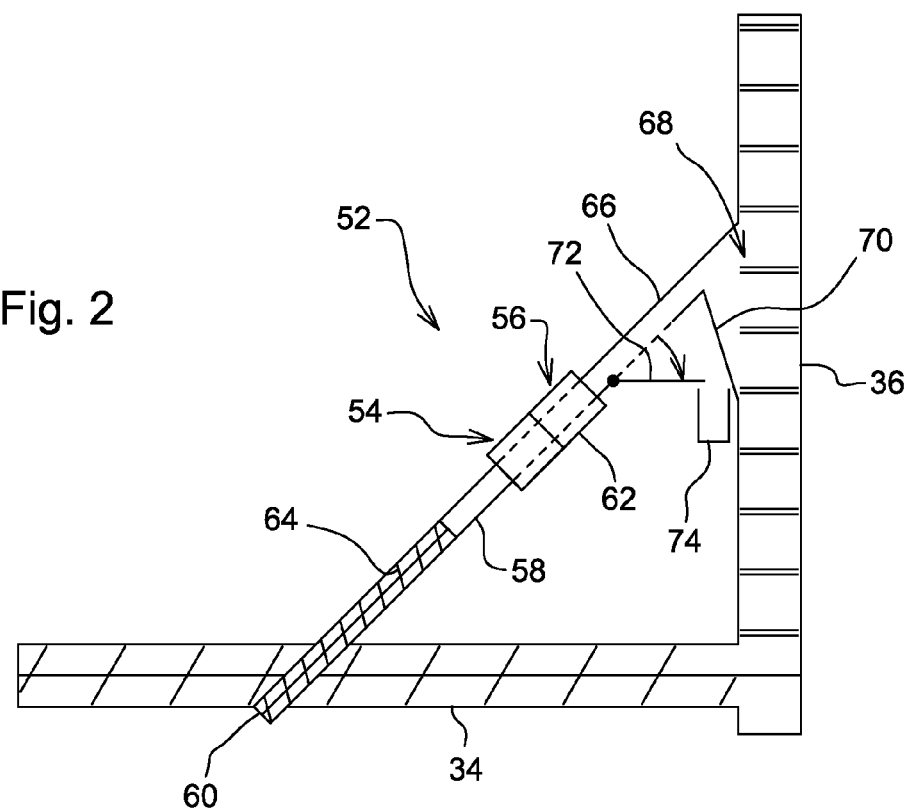
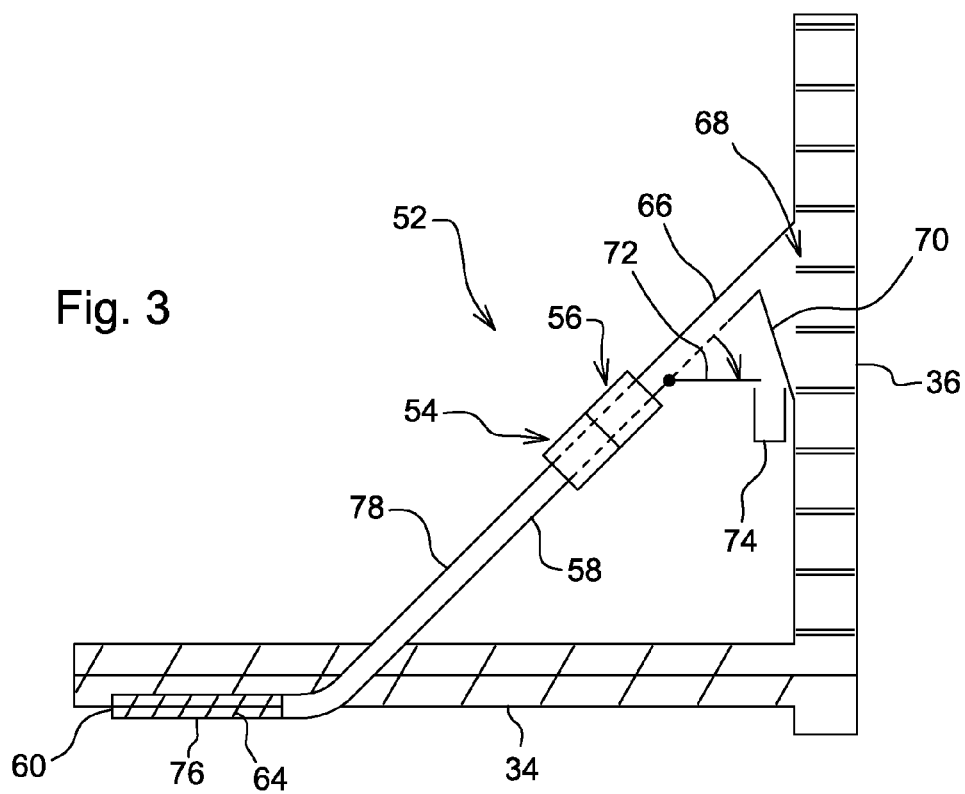

CROP SAMPLE PRESENTATION SYSTEM

CROSS REFERENCE TO RELATED-APPLICATION

This document (including the drawings) claims priority based on U.S. provisional application No. 61/285,578, filed on Dec. 11, 2009 and entitled Crop Sample Presentation System, under 35 U.S.C. 119(e).

FIELD OF THE INVENTION

The present invention relates to a sample presentation system for presenting a crop sample to a sensor in a harvesting machine.

BACKGROUND OF THE INVENTION

Combines are large machines that harvest, thresh and clean grain in a field. A combine comprises a number of adjustable elements, like the size of openings in a threshing concave or in a separating grate, the speed of a cleaning shoe blower and the position of louvers in a sieve. The optimal working parameter of these elements depends on the crop type and properties and can change over time. The adjustment of these parameters is usually performed by the combine operator based upon instruction manuals or his experience or automatically based on values stored in a memory and recalled dependent on actual conditions by the operator. In the past, numerous sensors for sensing crop properties (like capacitive moisture sensors, cameras and near infrared spectrometers) have been proposed to evaluate crop properties on board of the combine to provide input for an automatic control of one or more of the working parameters. Another use of the sensors is to collect crop parameters for precision farming or documentation purposes, in particular in forage harvesters, combines and balers.

The presentation of the crop sample to the sensor is critical to obtain an appropriate sensor output. The prior art comprises among others sensors mounted directly to the outer wall of a cross auger in a cleaning system that delivers the cleaned grain to a clean grain elevator (U.S. Pat. No. 5,092,819 A1), in a bypass of the clean grain elevator or of the cross auger (U.S. Pat. No. 6,327,899 A1), or at the downstream end of an auger that receives crop through an opening in the wall of a crop acceleration blower of a forage harvester (DE 102 36 515 C1). Further, it was proposed to feed a part of the crop residues downstream a straw chopper to a comminuting device and then to a near infrared spectrometer (EP 2 119 339 A1). This arrangement is not suited for checking properties of grain, since it would destroy the kernels.

When grain is fed in a horizontal auger, like in the prior art cross augers, and the sensor looks into the interior of the auger tube, the problem arises that when the crop flow is relatively low, such that crop is only present at the bottom of the tube, no reliable sensing is possible due to lack of sufficient crop material in front of the sensor. A similar problem arises when the harvesting machine drives up or down a hill. Mounting the sensor at the bottom of the auger tube, such that it looks upward upon the crop, does not resolve this problem, since smaller particles of the crop collect at the bottom of the tube, while the grain collects above these smaller particles.

Thus, there is a need for a crop sample presentation system that provides a representative, realistic sample of the crop in front of a crop sensor.

It is an object of the present invention to provide a sample presentation system improved over the prior art.

SUMMARY OF THE INVENTION

A system for presenting a crop sample to a crop property sensor is described. The system is in particular suited for a harvesting machine and comprises a bypass line branching off from a crop feeding assembly, a conveyor for feeding the branched-off crop through the bypass line generally without damaging the crop, and a crop property sensor for sensing one or more properties of the crop in the bypass line. The bypass line is upwardly angled or extends vertical, such that the conveyor elevates or raises the material from the crop guiding channel to the crop property sensor.

Due to the vertical component or extension of the movement of the crop material in the bypass line, segregation effects are avoided or at least reduced. The crop property sensor thus receives a representative sample of the crop.

These and other objects, features and advantages of the present invention will become apparent to one skilled in the art upon reading the following detailed description in view of the drawings.

BRIEF DESCRIPTION OF THE DRAWINGS

FIG. 2 is a schematic rear view of a first embodiment of a crop sample presentation system according to the invention.

FIG. 3 is a schematic rear view of a second embodiment of a crop sample presentation system according to the invention.

DESCRIPTION OF THE PREFERRED EMBODIMENT

Figure 1:
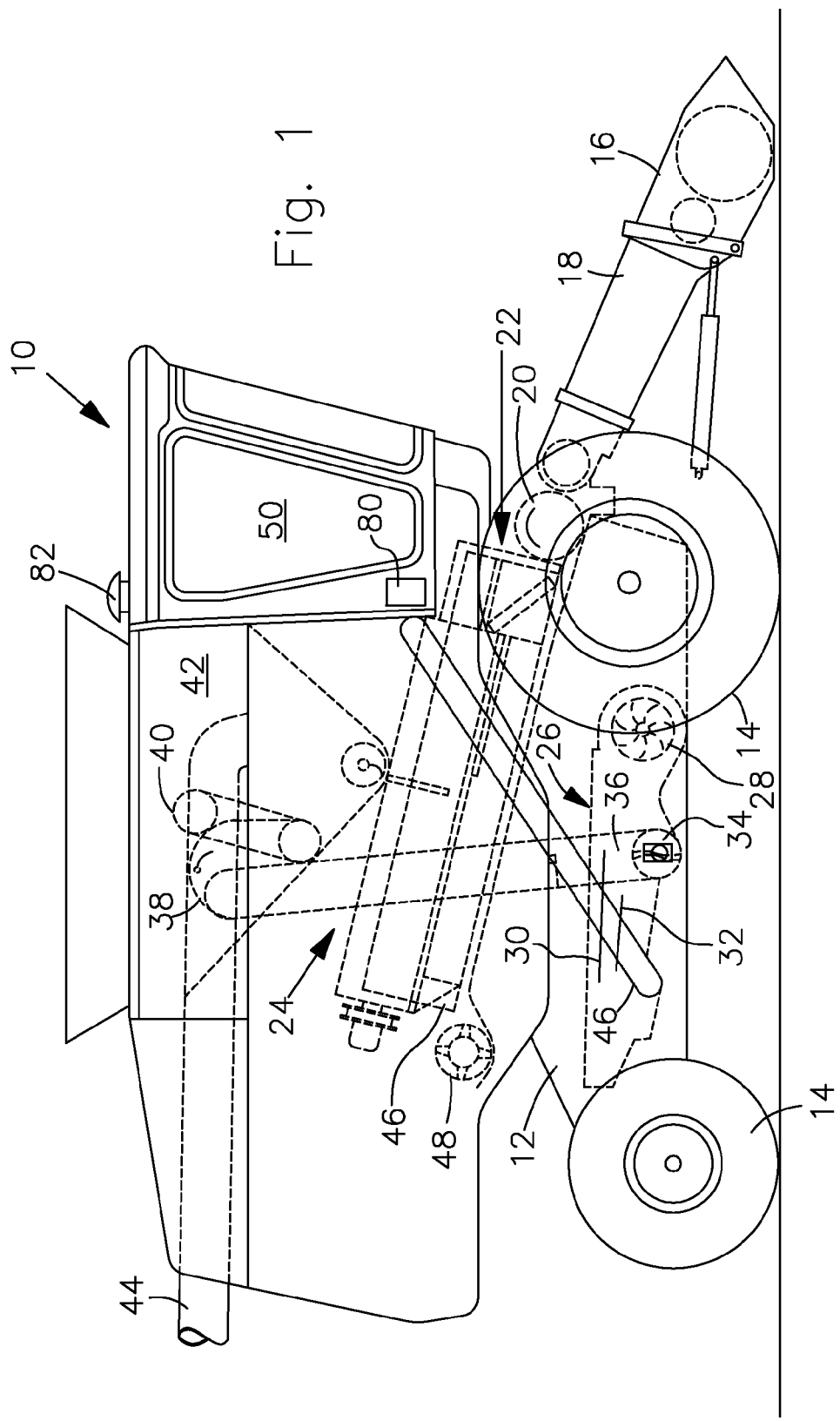
FIG. 1 is a side view of a harvesting machine.

Referring now to FIG. 1, therein is shown an agricultural vehicle in the form of a harvester or combine 10 comprising a main frame 12 having driven front and steerable rear ground engaging wheels 14 supporting the main frame for forward movement over a field of crop to be harvested. Although wheels 14 are shown, the combine 10 could be supported entirely or in part on ground engaging tracks. Drive to the front wheels 14 is provided through a conventional hydrostatic transmission by an internal combustion engine mounted on the frame 12. In the following, references to directions (like forward) are cited with respect to the forward direction of combine 10 that is directed to the right in FIG. 1.

A vertically adjustable header in the form of a harvesting platform 16 is used for harvesting a crop and directing it to a feederhouse 18. The feederhouse 18 is pivotally connected to the frame 12 and includes a conveyor for conveying the harvested crop to a beater 20. The beater 20 directs the crop upwardly through an inlet transition section 22 to a rotary threshing and separating assembly 24. Other orientations and types of threshing structures and other types of headers 16, such as a transverse frame supporting individual row units, could also be utilized.

During harvesting operation, the rotary threshing and separating assembly 24 threshes and separates the harvested crop material. Grain and chaff fall through grates on the bottom of the rotary threshing and separating assembly 24 to a cleaning system 26. The cleaning system 26 comprises a blower 28 and upper sieves 30 and lower sieves 32 that remove the chaff. The clean grain is collected over the width of the cleaning system 26 by a cross auger 34 feeding it to a clean grain elevator 36. The clean grain elevator 36 comprises chains and slats and feeds the clean grain to a transition section 38 from where it is conveyed by a grain tank filling auger 40 into a grain tank 42. The clean grain in the tank can be unloaded into a grain cart or truck by unloading auger 44. Tailings are returned from the rear end of the lower sieve 32 to the rotary threshing and separating assembly 24 by a tailings elevator 46.

Threshed and separated straw is discharged from the axial crop processing assembly 24 through an outlet 46 to a discharge beater 48. The discharge beater in turn propels the straw out the rear of the combine. It should be noted that the discharge beater 48 could also discharge crop material other than grain directly to a straw chopper. The operation of the combine is controlled from an operator's cab 50.

In FIG. 2, a rear elevational view of the cross auger 34 and of the clean grain elevator 36 is given. The cross auger 34 and of the clean grain elevator 36 make up a crop feeding assembly. FIG. 2 further shows a system 52 for presenting a crop sample to crop property sensors 54 and 56. The first crop property sensor 54 is a near infrared spectrometer for detecting constituents of the grain and the second crop property sensor 56 can be a camera for taking images of the grain or a non-imaging photo detector for detecting damaged grain. Alternatively or additionally, a moisture measurement cell (not shown), working in particular with a cell containing a sample and a capacitor for determining the dielectric properties of the cell, can be provided. The system 52 comprises a bypass line 58 with an inlet 60 branching off at the bottom of the cross auger 34. The bypass line 58 extends diagonally upwards under an angle of about 45° to the horizontal. The bypass line 58 extends into a measuring chamber 62 that comprises windows with screens through which the sensors 54 and 56 interact with the crop therein. The crop is fed from the inlet 60 to the measuring chamber 62 by a driven auger 64. Auger 64 and the surrounding part of bypass line 58 make up a conveyor for feeding the branched-off crop through the bypass line 58 without damaging the grain therein. The auger 64 terminates in a distance upstream the measuring chamber 62 in order not to disturb the sensors 54, 56. Downstream the measuring chamber 62, the crop is guided through a conduit 66 forming a part of the bypass line 58 and terminating in an outlet 68 through which the crop can enter the downward moving side of the clean grain elevator 36. Thus, the sampled crop is fed forward into the stream of the crop at the outlet 68 which is located downstream of the inlet 60 of the bypass line 58 such that the sensed crop is not presented to the sensors 54, 56 a second time. To avoid pinching of the grain at the outlet 68, the wall of the elevator 36 has an outwardly sloped section 70 beneath the outlet 68.

In the second embodiment according to FIG. 3, elements having corresponding elements in FIG. 2 have been assigned like reference numerals. The difference to the first embodiment consists therein that the bypass line 58 comprises a first, horizontal section 76 and a second, upwardly angled section 78. Only the first section contains the rotationally driven auger 64.

During the harvesting operation, clean grain is fed through the cross auger 34. The auger 64 is driven and conveys grain from the inlet 60 through the bypass line 58. The subsequently following grain pushes the grain through the parts of the bypass line 58 that do not contain any auger 64. The grain thus reaches the measuring chamber 62 and is sensed by the sensors 54 and 56. Afterwards, it is expelled through the conduit 66 into the outlet 68 and thus conveyed into the grain tank 42 by the clean grain elevator 36. An advantage of the sloped vertical position of the bypass line 58 is that no or only a significantly reduced segregation of the crop into smaller and larger particles can appear, since the slope of the bypass line reduces the segregation effect of the gravitation. The vertical movement of the crop in the bypass line further ensures a homogenous sample density and distribution, uniform grain orientation and packaging, and voids and blockages of the crop are avoided. No additional plungers for compressing the sample to a desired density are required and thus their disadvantages, like high contact pressure, friction and wear are avoided.

In the conduit 66, a crop sample taking flap 72 is provided that can be opened by a suited actuator (not shown) under the control of a control unit 80 to collect crop in a container 74. The corresponding position of the combine 10, and thus information on where the sample was harvested, can be taken from a position determining system antenna 82 preferably receiving GPS signals and stored in a memory.

Having described the preferred embodiment, it will become apparent that various modifications can be made without departing from the scope of the invention as defined in the accompanying claims.

The following is claimed:

1. In a harvesting machine having a crop feeding assembly, a system for presenting a crop sample to a crop property sensor, the system comprising a bypass line branching off from the crop feeding assembly, a conveyor for feeding the branched-off crop through the bypass line generally without damaging the crop, and the crop property sensor for sensing one or more properties of the crop in the bypass line, where the bypass line is one of upwardly angled and vertically extending from a cross auger to a clean grain elevator, such that the conveyor elevates the crop sample from a crop guiding channel of the cross auger to the crop property sensor.

2. The system according to claim 1, wherein the crop feeding assembly comprises the cross auger arranged to collect clean grain in a combine cleaning shoe and the clean grain elevator arranged to feed the grain into a grain tank, and wherein an inlet of the bypass line is at the cross auger.

3. The system according to claim 2, wherein an outlet of the bypass line is at a downward moving side of the clean grain elevator.

4. The system according to claim 3, wherein a wall of the elevator has an outwardly sloped section beneath the outlet of the bypass line to avoid pinching of the grain at the outlet.

5. The system according to claim 1, wherein the crop property sensor is mounted at a measuring chamber that has an inlet connected to the bypass line and an outlet connected to at least one of a sample collecting device and a conduit connected to the crop feeding assembly downstream an inlet of the bypass line.

6. The system according to claim 5, wherein the conveyor comprises a driven element having a downstream end located upstream the measuring chamber.

7. The system according to claim 6, wherein the conveyor has a horizontal upstream portion and an upwardly angled downstream portion, and wherein the driven element is only provided in the horizontal upstream portion.

8. The system according to claim 6, wherein the entire conveyor extends one of upwardly angled or vertical.

9. The system according to claim 1, wherein the conveyor is an auger conveyor.

10. The system according to claim 1, wherein the crop property sensor comprises at least one of a camera, a near infrared spectrometer and a moisture measurement cell.

11. A harvesting machine with a crop feeding assembly and a system for presenting a crop sample to a crop property sensor, the system comprising a bypass line branching off from the crop feeding assembly, a conveyor for feeding the branched-off crop through the bypass line generally without damaging the crop, and the crop property sensor for sensing one or more properties of the crop in the bypass line, where the bypass line is one of upwardly angled and vertically oriented from a cross auger to a clean grain elevator, such that the conveyor elevates the crop sample from a crop guiding channel of the cross auger to the crop property sensor.

12. The harvesting machine according to claim 11, wherein the crop feeding assembly comprises the cross auger arranged to collect clean grain in a combine cleaning shoe and the clean grain elevator arranged to feed the grain into a grain tank, and wherein an inlet of the bypass line is at the cross auger.

13. The harvesting machine according to claim 12, wherein an outlet of the bypass line is at a downward moving side of the clean grain elevator.

14. The harvesting machine according to claim 13, wherein a wall of the elevator has an outwardly sloped section beneath the outlet of the bypass line to avoid pinching of the grain at the outlet.

15. The harvesting machine according to claim 11, wherein the crop property sensor is mounted to a measuring chamber that has an inlet connected to the bypass line and an outlet connected to at least one of a sample collecting device and a conduit connected to the crop feeding assembly downstream an inlet of the bypass line.

16. The harvesting machine according to claim 15, wherein the conveyor comprises a driven element having a downstream end located upstream the measuring chamber.

17. The harvesting machine according to claim 16, wherein the conveyor has a horizontal upstream portion and an upwardly angled downstream portion, and wherein the driven element is only provided in the horizontal upstream portion.

18. The harvesting machine according to claim 16, wherein the entire conveyor extends one of upwardly angled or vertical.

19. The harvesting machine according to claim 11, wherein the conveyor is an auger conveyor.

20. The harvesting machine according to claim 11, wherein the crop property sensor comprises at least one of a camera, a near infrared spectrometer and a moisture measurement cell.

* * * * *